US012003825B1

(12) United States Patent
Nair

(10) Patent No.: US 12,003,825 B1
(45) Date of Patent: Jun. 4, 2024

(54) ENHANCED CONTROL OF VIDEO SUBTITLES

(71) Applicant: Amazon Technologies, Inc., Seattle, WA (US)

(72) Inventor: Naveen Sudhakaran Nair, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/949,822

(22) Filed: Sep. 21, 2022

(51) Int. Cl.
*H04N 21/488* (2011.01)

(52) U.S. Cl.
CPC ............................... *H04N 21/4884* (2013.01)

(58) Field of Classification Search
None
See application file for complete search history.

(56) References Cited

U.S. PATENT DOCUMENTS

| 8,079,054 | B1 * | 12/2011 | Dhawan | H04N 21/812 |
| | | | | 705/14.6 |
| 9,565,456 | B2 * | 2/2017 | Helferty | G06Q 30/02 |
| 9,852,773 | B1 * | 12/2017 | Salvador | G11B 27/22 |
| 10,965,888 | B1 * | 3/2021 | Boyd | G06F 3/0486 |
| 11,109,095 | B2 * | 8/2021 | Chen | H04N 21/431 |
| 11,120,293 | B1 * | 9/2021 | Rosenzweig | G06T 7/215 |
| 2008/0031601 | A1 * | 2/2008 | Hashimoto | H04N 21/6581 |
| | | | | 348/E7.071 |
| 2008/0043996 | A1 * | 2/2008 | Dolph | H04N 21/4334 |
| | | | | 379/388.07 |
| 2010/0045866 | A1 * | 2/2010 | Angiolillo | H04N 21/8106 |
| | | | | 348/554 |
| 2010/0098389 | A1 * | 4/2010 | Shimada | G11B 27/105 |
| | | | | 386/E5.068 |
| 2011/0016385 | A1 * | 1/2011 | Kasuga | H04N 1/3872 |
| | | | | 715/243 |
| 2011/0082744 | A1 * | 4/2011 | Iida | G06Q 30/0241 |
| | | | | 705/14.53 |
| 2011/0149036 | A1 * | 6/2011 | Suh | H04N 21/47 |
| | | | | 348/E13.001 |
| 2013/0073998 | A1 * | 3/2013 | Migos | G06F 40/166 |
| | | | | 715/776 |
| 2013/0278824 | A1 * | 10/2013 | Einarsson | H04N 7/0885 |
| | | | | 348/468 |

(Continued)

*Primary Examiner* — An Son P Huynh
(74) *Attorney, Agent, or Firm* — Eversheds Sutherland (US) LLP

(57) ABSTRACT

Devices, systems, and methods are provided for presenting on-screen text during video playback. A method may include detecting a user request to determine when to activate and deactivate presentation of on-screen text during playback of a video; inputting, to a machine learning model, text data of video titles, audio data of the video titles, video frames of the video titles, and user data associated with users of a streaming video application; generating, using the machine learning model, based on the text data, the audio data, the video frames, and the user data, the first times and the second times; sending a bitstream comprising streaming video and indications of the first times and the second times; activating, based on the first times, presentation of the on-screen text during presentation of the streaming video; and deactivating, based on the second times, presentation of the on-screen text during presentation of the streaming video.

20 Claims, 9 Drawing Sheets

(56) References Cited

U.S. PATENT DOCUMENTS

| | | | |
|---|---|---|---|
| 2014/0184905 A1* | 7/2014 | Mountain | H04N 21/42204 |
| | | | 348/468 |
| 2016/0378762 A1* | 12/2016 | Rohter | G06F 16/285 |
| | | | 707/728 |
| 2017/0125019 A1* | 5/2017 | Ganesan | H04W 4/12 |
| 2017/0134821 A1* | 5/2017 | D'Amelio | H04N 21/42203 |
| 2017/0185260 A1* | 6/2017 | Mardirossian | H04N 21/4316 |
| 2018/0089556 A1* | 3/2018 | Zeiler | G06N 3/08 |
| 2018/0091769 A1* | 3/2018 | Kitazato | H04N 21/4884 |
| 2019/0116101 A1* | 4/2019 | Harb | H04N 21/25891 |
| 2019/0123842 A1* | 4/2019 | Tsukagoshi | H04H 20/28 |
| 2019/0306563 A1* | 10/2019 | Chen | H04N 21/442 |
| 2020/0084505 A1* | 3/2020 | Reid | H04N 21/4396 |
| 2021/0058680 A1* | 2/2021 | Kitazato | H04N 21/2362 |
| 2021/0084381 A1* | 3/2021 | Marten | H04N 21/4884 |
| 2021/0203753 A1* | 7/2021 | Kuo | H04L 67/535 |
| 2021/0352379 A1* | 11/2021 | Black | H04N 21/42203 |
| 2021/0365742 A1* | 11/2021 | Wang | G06V 20/46 |
| 2022/0141527 A1* | 5/2022 | Channapragada | G11B 27/36 |
| | | | 725/18 |
| 2022/0148614 A1* | 5/2022 | Block | G10L 15/26 |
| 2023/0010466 A1* | 1/2023 | Port | H04R 5/04 |

* cited by examiner

ENHANCED CONTROL OF VIDEO SUBTITLES

BACKGROUND

The use of subtitles in videos is becoming more prevalent due to videos being presented in different languages, for example. Some viewers may prefer an original actor's voice in a foreign language with subtitles presented rather than a dubbed audio translation, and some viewers may not like the mismatch between audio and lip movements when audio is dubbed in a different language. Forcing viewers to activate and deactivate subtitles can undermine user experience.

Figure 1:
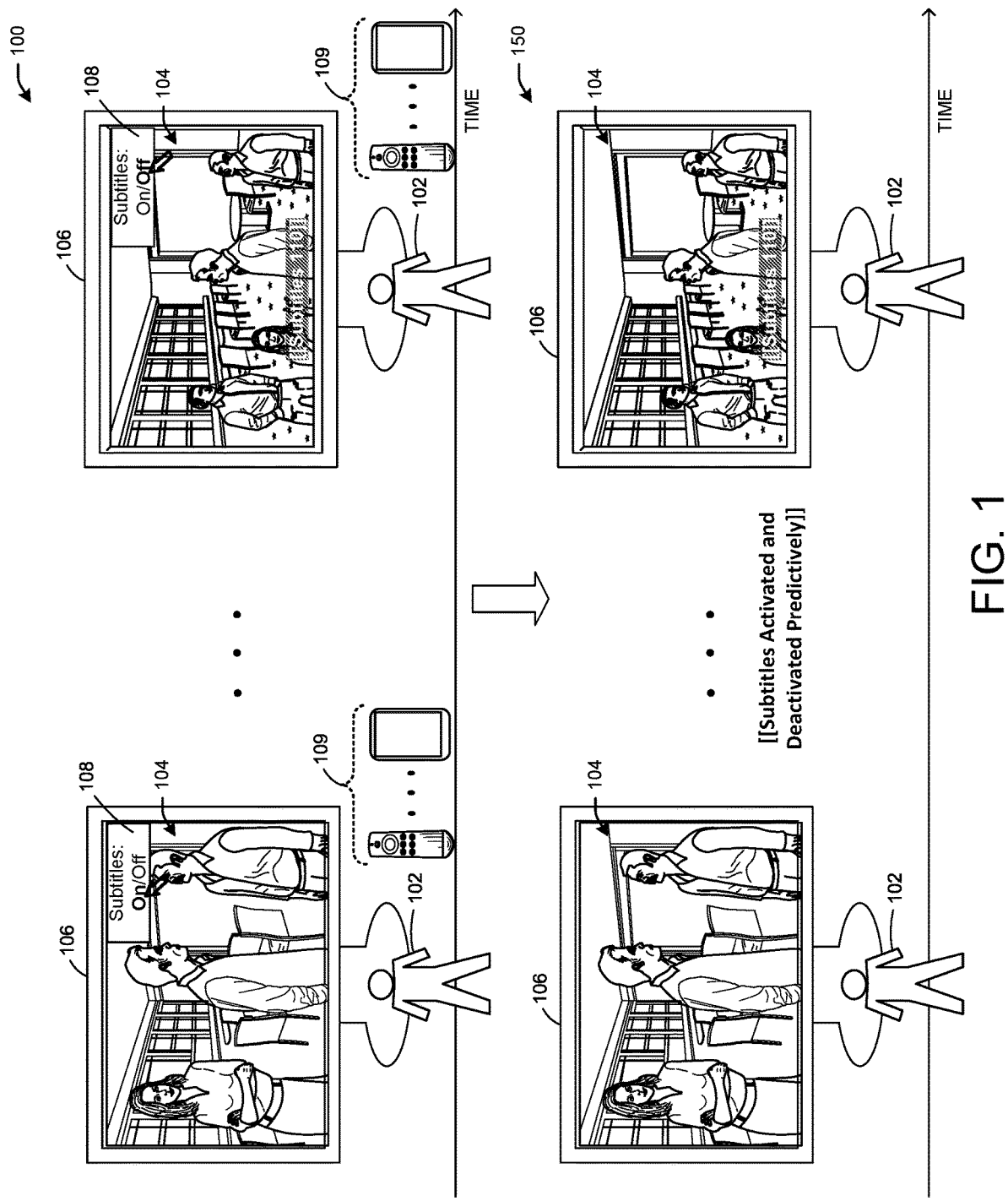
FIG. 1 illustrates example subtitle activation and deactivation processes, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for controlling the activation and deactivation of video subtitles.

Videos may be presented with subtitles for various reasons, such as to translate audio content into another language, or to help a viewer read what may be spoken or otherwise communicated verbally in the video's corresponding audio. Viewers may prefer subtitles in some situations when watching a video, and may not prefer subtitles in other situations. A viewer may prefer subtitles or not prefer subtitles for an entire video title, or may prefer subtitles only for portions of a video title.

Streaming video applications may allow viewers to activate and deactivate subtitles. When a viewer wants to activate subtitles, the viewer may need to navigate to a menu within the application, select a subtitles menu icon, and select the subtitle language they want to read. After they complete reading the part that needed clarification, the viewer may have to navigate to the menu, click the subtitles menu icon, and deactivate the subtitles. The subtitle activation and deactivation may involve several distracting steps that may negatively affect the user experience in watching video.

There is therefore a need for enhanced controlling of the activation and deactivation of video subtitles.

In one or more embodiments, a streaming video application may allow a viewer to activate the presentation of subtitles by hovering a mouse pointer of a subtitle icon on a screen, bringing the mouse pointer to a defined "hot corner" of the screen, or pressing a "hot key" on a remote controller. When the viewer moves the mouse pointer away, presses the remote control hot key again (or depresses it), the subtitles may be deactivated. The enhanced subtitle activation and deactivation methods are simpler and more convenient that requiring the viewer to navigate to a menu and make selections within the menu either during presentation of a video (e.g., distracting from the presentation), or in a general menu outside of the video presentation (e.g., requiring stoppage of the video presentation). To change subtitle settings, a viewer may use a menu to make a settings change one time to allow for the enhanced user interface allowing for the enhanced selection and deactivation of subtitles.

In one or more embodiments, the video application may predict when a viewer may want to see or not see subtitles, and may activate and deactivate the subtitles automatically (e.g., without requiring the user to activate or deactivate the subtitles) based on the predictions. A system for the video application may record instances where viewers wanted to read subtitles. After receiving enough data (e.g., regarding when viewers activate and deactivate subtitles) to train a machine learning model, the system may train the machine learning model that would predict when a viewer would prefer to read subtitles. The machine learning model, after training, may take subtitle text, speech, and background noise signals, visual cues, and the like, at a particular instance of a video title along with viewer preferences (e.g., genre, language, etc.) as inputs, and may predict whether a viewer prefers to read subtitles at that instance. Viewers may be given options to disable or reset automatic subtitle activation/deactivation, for example, in a subtitle settings menu. Accordingly, a viewer may enable or disable the automatic subtitle activation/deactivation at any time. When the automatic subtitle activation/deactivation is enabled, subtitles may be activated and deactivated automatically rather than the viewer manually activating and deactivating the subtitles. In disabled mode, only the automatic appearance of subtitles based on prediction would be disabled. Viewers would still be able to read subtitle by hovering over the subtitle icon or hot corner of the user interface presented with the video content. If a viewer resets the setting, their personal preferences may be reset.

In one or more embodiments, the machine learning model may include a text encoder for subtitles, an audio encoder for audio features, a video encoder for video frames, and a user preference encoder for user data (e.g., users of the video application). The encoders may encode respective features into vector embeddings that may be input into a multi-layered neural network. For example, the neural network may include one or more layers for evaluating subtitle features, one or more convolution layers for evaluating audio features, one or more convolution layers for evaluating video frame features, and one or layers for evaluating user preferences (e.g., based on the embeddings generated by the respective encoders). The layers may learn which features of the embeddings correspond to when a given users, or users generally, activate or deactivate subtitles, and/or portions of particular video titles when a given user, or users generally, activate or deactivate subtitles. The convolution layers for video and audio may generate feature embeddings fed into a machine learning model (e.g., a fully connected neural network). The machine learning model may exclude from the user data the subtitle preferences of users who always or never activate subtitles, as those users' subtitle preferences may be less helpful to the analysis.

In one or more embodiments, the machine learning model may evaluate subtitles that correspond (e.g., in time) with the video frames being presented to determine (e.g., using the user data) whether users have activated or deactivated subtitles at that time. When multiple users activate or do not activate subtitles for the same portions of a video title, the machine learning model may learn that those portions should include or not include the presentation of subtitles. Similarly, when audio features such as background noise (e.g., in the video), low-register voices, and the like, result in users activating subtitles for a particular portion of a video, the machine learning model may learn that portions of video with similar audio features may be candidates for automatic subtitle activation. The analysis of the embeddings to detect when subtitles may be activated or not activated may be based on similarities (e.g., cosine similarities) between the embeddings. For example, an embedding of audio features that corresponds to a time when users tend to activate subtitles of a video title may be compared to embeddings of audio features in other video titles, and when there are similarities (e.g., the distances between features of the embeddings are within threshold ranges), the machine learning model may learn when to activate and deactivate subtitles. The similarities may be computed implicitly by the ML model and may not be interpretable. In another example, the machine learning model may learn when there are sounds that may make it difficult for a person to understand speech, such as when there are explosions, people crying, and the like. In another example, a user's primary language as indicated by their user data may be different than the language with which video/audio is presented, which may trigger subtitle activation. In this manner, the machine learning model may learn when subtitles are activated and deactivated for specific portions of video titles (e.g., during which video frames), what the audio features are of the video frames, and use the audio features to identify similar audio features in other video titles for which subtitles should therefore be activated when the audio features are present in the video titles. The analysis of when subtitles are to be activated and deactivated is not video title-dependent, but rather is based on the content. For example, the language, type of noise, volume of speech, and the like in one segment of one video title may be the same as or similar to a segment of another video title whose user activations/deactivations of subtitles may inform the decision of whether to activate/deactivate subtitles of the one video title.

In one or more embodiments, ambient noise may be considered when determining when to activate subtitles. For example, a device that presents streaming video may have one or more microphones to detect ambient noise, and/or may receive indications of ambient noise from other nearby devices with microphones that may detect the ambient noise. When the ambient noise level exceeds a threshold during video playback, the device that presents streaming video may activate subtitles even if the user and/or machine learning model have deactivated subtitles at that time. Similarly, the device that presents streaming video may activate subtitles when the device detects that its volume level for presenting streaming video is below a volume threshold (e.g., indicating that speech in the video may be difficult to hear), even when the user and/or machine learning model have deactivated subtitles at that time. The device may deactivate subtitles when the volume and/or ambient noise is below a threshold level.

In one or more embodiments, for existing titles for which user subtitle preferences are known, the machine learning model may determine that subtitles should be activated for other users when watching the same portions of the video title. When a specific user's preferences for subtitles differ from other users' preferences, the machine learning model may learn the audio features of the portions of videos when the specific user activates subtitles in order to predict when the specific user would prefer subtitle activation or deactivation. In this manner, two different users watching a same video title may not be presented with subtitles or other on-screen text at the same portions of the video. The machine learning model may analyze the subtitle features, such as legibility, language, length/number of words or characters, amount of space on the screen needed for presentation, quality of language translation (e.g., some phrases in one language may not translate well or to anything in another language), legibility on the screen, and the like, to learn whether there is a causal relationship between those features and when users activate or deactivate subtitles. Using the subtitle embeddings, the machine learning model may identify subtitles that are more or less likely for users to prefer to be activated.

In one or more embodiments, the machine learning analysis and enhanced user activation/deactivation techniques do not have to be limited to subtitles. Other on-screen text, such as descriptions of signs, translation of presented text, song titles, and the like, may be controlled in the same manner. For example, when an English viewer is watching a video title with Japanese text presented on the screen, a translation of the on-screen text may be presented or not presented based on the same analysis of whether users are activating the supplemental text presentation based on the features of the text, the features of the video, the user preferences, and the features of the audio.

In one or more embodiments, the machine learning model may determine, based on the features indicated by the embeddings, whether and how to modify subtitles and other on-screen text. For example, if a text translation is too long to be read on screen, the text may be modified by selecting corresponding words with shorter length, or the text may be presented during a video frame different from ones in which the corresponding words are being spoken. The color of the text may be selected based on the color of the pixels in a video frame, and similarly the location where the text may be presented with a video frame may be selected so that there is enough color contrast between the text and the video frame pixels for a viewer to discern the text on the screen.

In one or more embodiments, the system that has determined whether or not to activate subtitles or other on-screen text supplementing streaming video content may use the video bitstream to provide indications of when to present the subtitles or other on-screen text. In this manner, the video application that receives the bitstream for playback also may receive the signaling needed to determine when to activate subtitles or other on-screen text during presentation of the video.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates example subtitle activation and deactivation processes, in accordance with one or more example embodiments of the present disclosure.

Referring to FIG. 1, a process 100 may include a user 102 turning on and off presentation of subtitles during presentation of video content 104 (e.g., a streaming video from a bitstream, video on demand, linear television, etc.) using a device 106. In particular, the user 102 may select an indicator 108 to turn on or off subtitles 110. The user 102 may use an input device 109 to make the selection to turn on or off the subtitles 110 (e.g., by pushing a button while hovering over the on/off option of the indicator 108 to present the subtitles 110). Alternatively, the user 102 may utter a verbal command to activate or deactivate the subtitles 110.

Still referring to FIG. 1, a process 150 may allow the user 102 to avoid having to make a subtitle option selection via the indicator 108 (or by verbal utterance) during presentation of the video content 104. In this manner, the process 150 may be less disruptive of the presentation of the video content 104. In the process 150, the subtitles 110 may be activated automatically at any portion of the video content 104 presentation without the user 102 having to activate or deactivate the subtitles 110 during the presentation of the video content 104.

Figure 3:
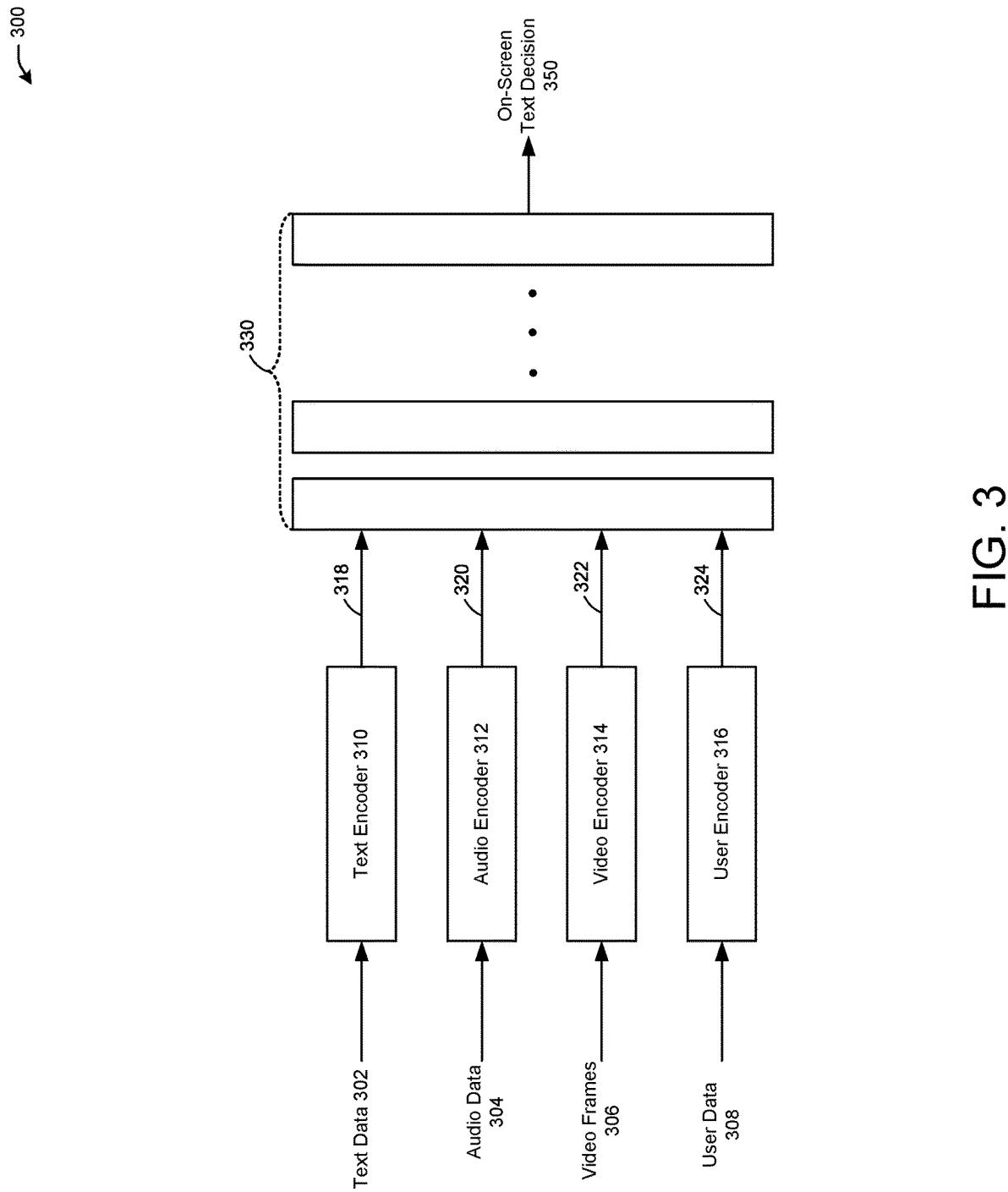
FIG. 3 illustrates an example machine learning model for predicting subtitle activation and deactivation, in accordance with one or more example embodiments of the present disclosure.
Figure 5:
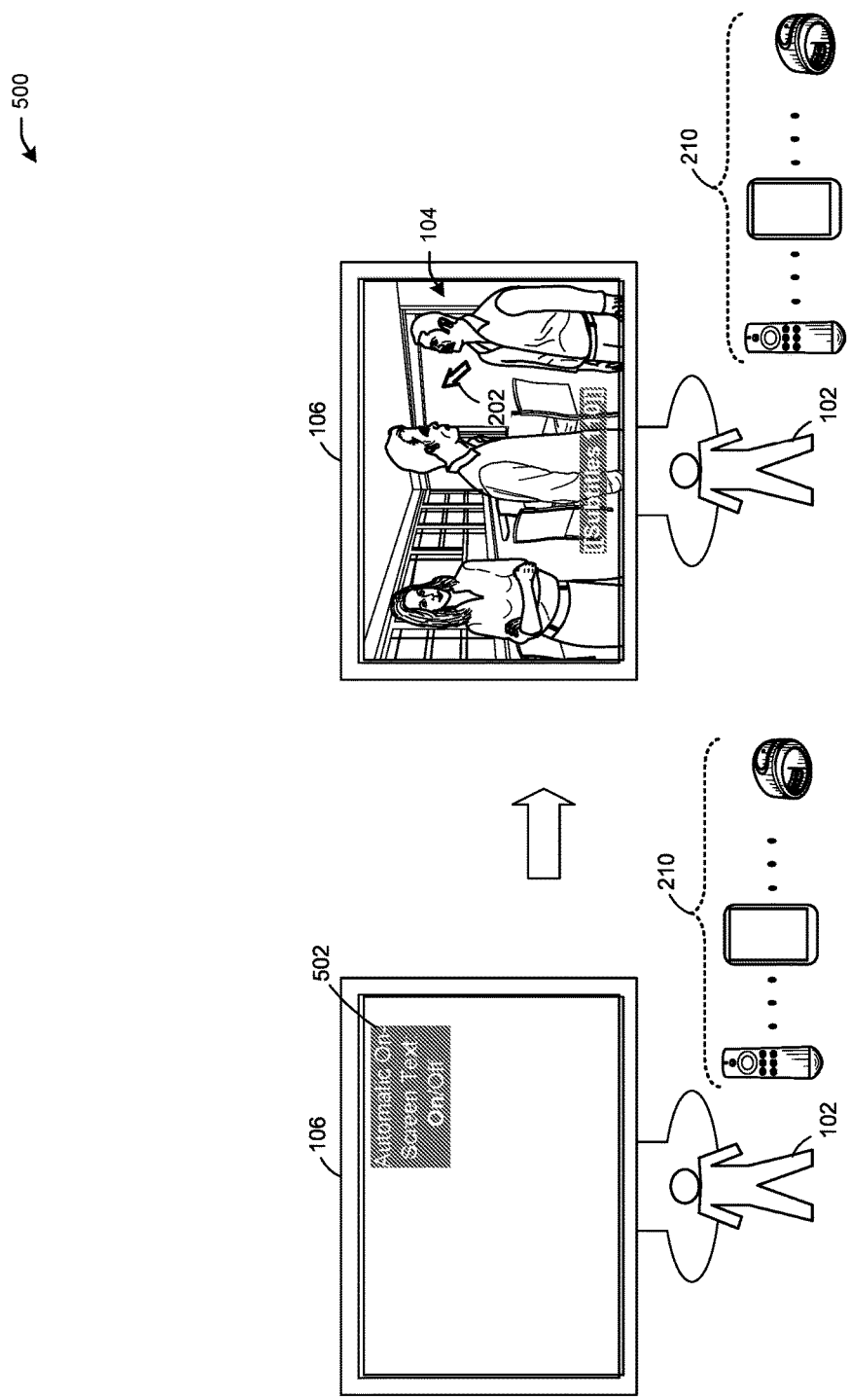
FIG. 5 illustrates an example enabling and disabling process for automatic subtitle activation and deactivation, in accordance with one or more example embodiments of the present disclosure.

In one or more embodiments, the automatic subtitle presentation of the process 150 may be enabled by various user selections that are less disruptive than the process 100, such as by predictive analysis (e.g., as shown in FIG. 3) that may be enabled by the user 102 prior to playback of the video content 104 (e.g., as shown in FIG. 5).

Figure 2A:
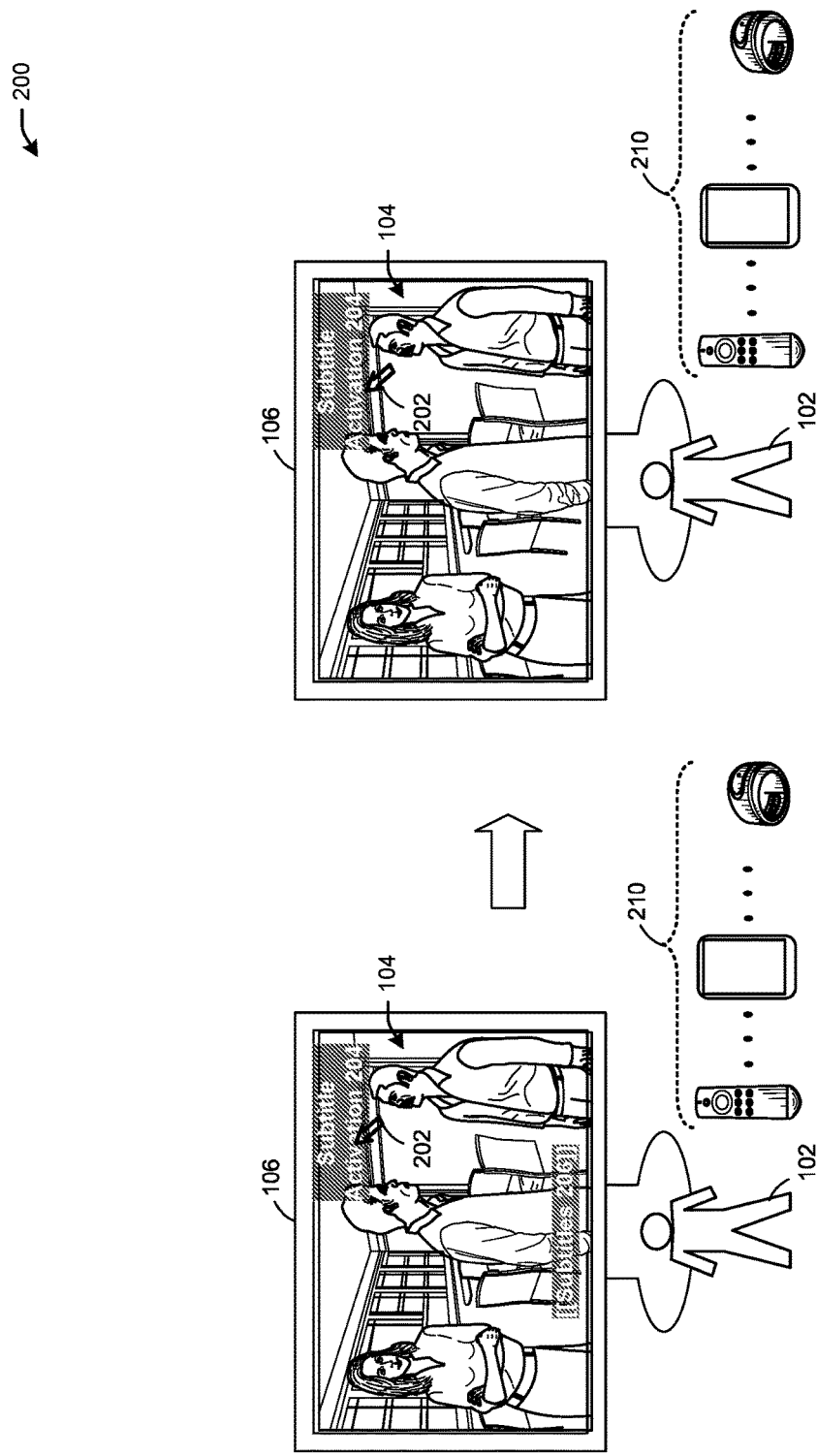
FIG. 2A illustrates an example subtitle activation and deactivation process, in accordance with one or more example embodiments of the present disclosure.

FIG. 2A illustrates an example subtitle activation and deactivation process 200, in accordance with one or more example embodiments of the present disclosure.

Referring to FIG. 2A, the subtitle activation and deactivation process 200 may occur in place of or in addition to the automatic subtitle presentation of the process 150 of FIG. 1. The user 102 may use a selector 202 (e.g., a cursor) to select a subtitle (or other on-screen text) activation indicator 204 without requiring the user 102 to navigate menus and sub-menus during presentation of the video content 104. For example, clicking, touching, or otherwise selecting the subtitle activation indicator 204 may cause activation and deactivation of the subtitles 206.

Figure 2B:
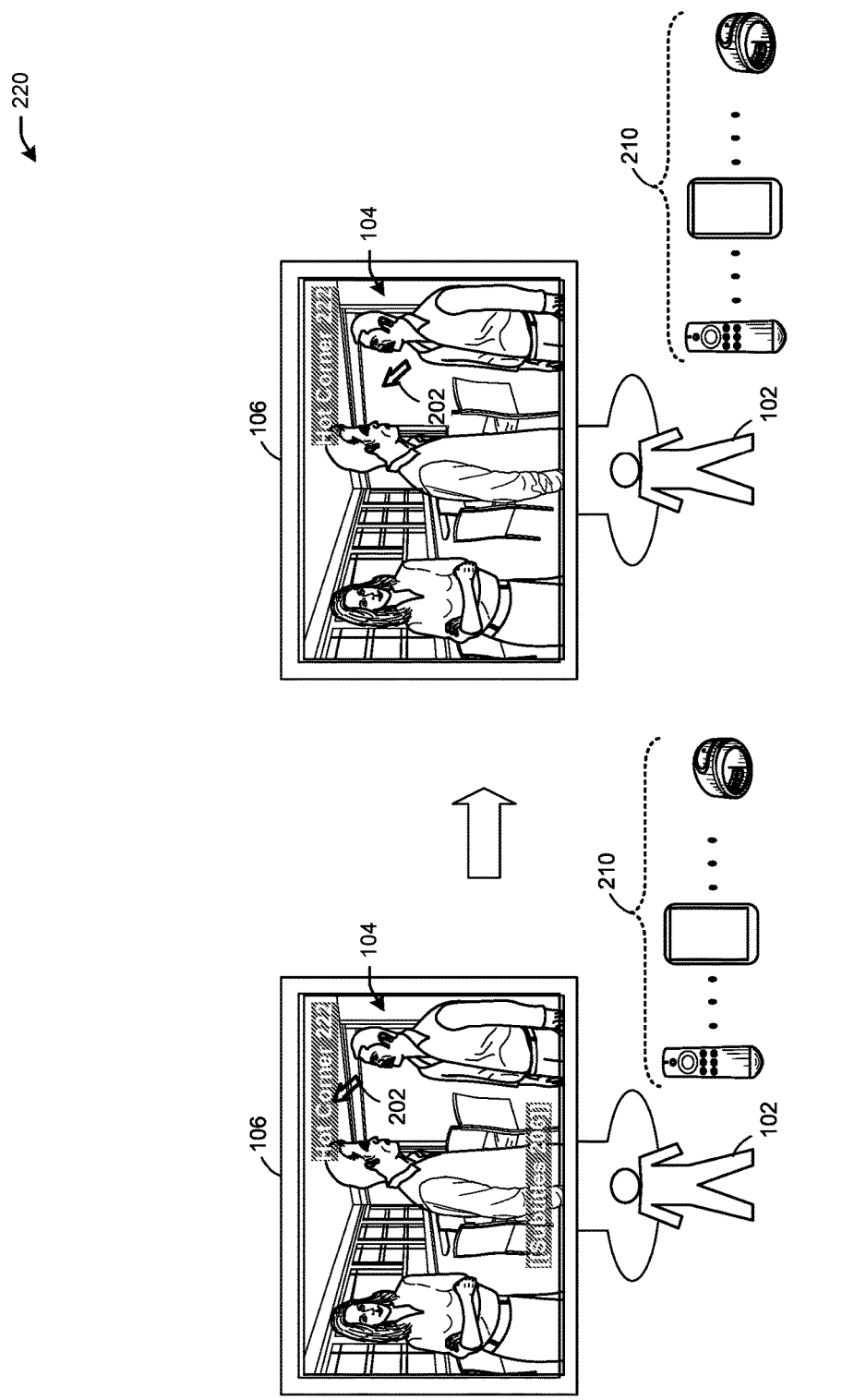
FIG. 2B illustrates an example subtitle activation and deactivation process, in accordance with one or more example embodiments of the present disclosure.

FIG. 2B illustrates an example subtitle activation and deactivation process 220, in accordance with one or more example embodiments of the present disclosure.

Referring to FIG. 2B, the subtitle activation and deactivation process 220 may occur in place of or in addition to the automatic subtitle presentation of the process 150 of FIG. 1. The user 102 may hover the selector 202 of FIG. 2A over a hot corner 222 or other portion of the presentation of the video content 104 via the device 106 of FIG. 1. While the selector 202 is hovering over the hot corner 222, presentation of subtitles 206 may be activated during presentation of the video content 104. When the user 102 moves the selector 202 off of the hot corner 222, presentation of the subtitles 206 may stop. In this manner, the user 102 may not need to navigate menus or provide verbal commands during presentation of the video content 104 to activate or deactivate subtitles or other on-screen text.

Referring to FIGS. 2A-2B, to move the selector 202, the user may use devices 210 such as a remote control, a touchscreen of the device 106, a mouse, or a wearable device configured to translate movements/gestures into commands, such as to move the selector 202 according to a body movement of the user 102.

Figure 2C:
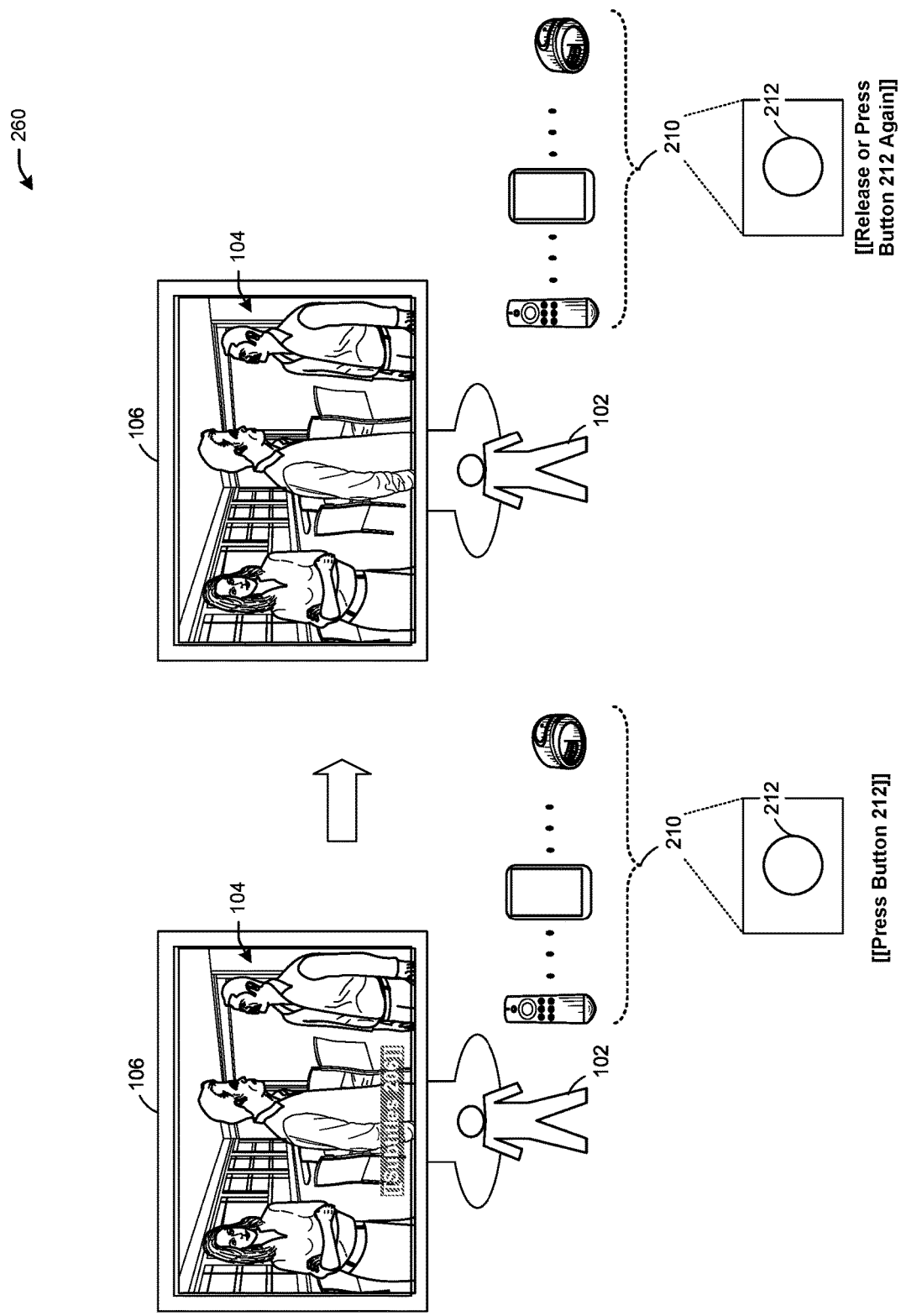
FIG. 2C illustrates an example subtitle activation and deactivation process, in accordance with one or more example embodiments of the present disclosure.

FIG. 2C illustrates an example subtitle activation and deactivation process 260, in accordance with one or more example embodiments of the present disclosure.

Referring to FIG. 2C, the user may use one of the devices 210 to activate or deactivate the subtitles 206 without having to make an on-screen selection. In particular, touching or pressing a button 212 of one of the devices 210 may cause automatic activation of the subtitles 206. Pressing the button 212 again, or depressing the button 212 (e.g., if the user 102 holds the button 212 down to activate the subtitles 206 temporarily), may deactivate the subtitles 206.

Referring to FIGS. 2A-2C, the subtitle activation and deactivation methods also may enable automatic subtitle activation and deactivation as described further with respect to FIG. 3. When automatic subtitle activation and deactivation is enabled, the presentation of subtitles and other on-screen text may occur without any further user input, such as button presses, cursor moves, hot corner selections, etc. In this manner, the automatic subtitle activation and deactivation may be predictive, and the user 102 may enable or disable the predictive option.

Still referring to FIG. 2C, user gestures such as raising a hand may provide interpretable inputs (e.g., based on device motion detected from a wearable device). Alternatively or in addition, an image capturing device (e.g., a camera) may detect user movements that may be converted into gesture commands. The gestures may be interpreted as activating or deactivating the subtitles 206. Such analysis may be based on user consent and compliant with relevant laws.

FIG. 3 illustrates an example machine learning model 300 for predicting subtitle activation and deactivation, in accordance with one or more example embodiments of the present disclosure.

Referring to FIG. 3, the machine learning model 300 may receive, as inputs, text data 302, audio data 304, video frames 306, and user data 308 corresponding to video titles and users of a streaming media application used to present the video titles. For example, the text data 302 may include subtitles and other on-screen text in one or more languages. The audio data 304 may include audio presented during the video frames 306, including spoken audio, music, background noises, sound effects, and the like. The user data 308 may include, with user consent and in accordance with relevant laws, user selections of when to activate and deactivate on-screen text presentation during various video titles. The machine learning model 300 may include a text encoder 310 for encoding features of the text data 302, an audio encoder 312 for encoding features of the audio data 304, a video encoder 314 for encoding features of the video frames 306, and a user encoder for encoding features of the user data 308.

Still referring to FIG. 3, the features of the text data 302 may be represented as vector embeddings 318 indicative of text features, such as number of words and characters, quality of language translation, and the like. The features of the audio data 304 may be represented as vector embeddings 320 indicative of audio features, such as audio clarity, audio speed, background noise, language, and the like. The features of the video frames 306 may be represented as vector embeddings 322 indicative of video features, such as pixel colors where the on-screen text would be presented, a number of video frames corresponding to the on-screen text (e.g., how many video frames and for what corresponding time duration would the on-screen text be presented?), and the like. The features of the user data 308 may be represented as vector embeddings 324 indicative of user features, such as when the users activated and activated subtitles during presentation of various video titles corresponding to the video frames 306. The text encoder 310 may generate the vector embeddings 318, the audio encoder 312 may generate the vector embeddings 320, the video encoder 314 may generate the vector embeddings 322, and the user encoder 316 may generate the vector embeddings 324.

The machine learning model 300 may include multiple convolutional layers 330 to analyze the embeddings generated by the encoders and generate an on-screen text decision 350, including times when to activate presentation of subtitles and other on-screen text, and when to deactivate presentation of subtitles and other on-screen text. For example, the convolutional layers 330 may determine when users have activated or deactivated subtitles during presentation of a particular video title. When the user 102 of FIG. 1 watches the video content 104, and the machine learning model 300 has identified when the user 102 or when other users have activated or deactivated subtitles or other on-screen text during the corresponding video title, the on-screen text decision 350 may indicate when the device 106 should activate and deactivate the presentation of subtitles or other on-screen text. When the user 102 is watching a video title that has not yet been analyzed for when users have activated and deactivated subtitles or other on-screen text during presentation of that video title, the machine learning model may use the embeddings from other video titles to predict when the user 102 would activate or deactivate the subtitles or other on-screen text. When the text, audio, and/or video have similar features to when subtitles or other on-screen text have been activated or deactivated during presentation of other video titles, the on-screen text decisions 350 may be based on the similar features. For example, when text and/or audio use a certain language, have a certain amount of words to display during a certain time period or during video frames with certain types or amounts of content represented during subtitle or other on-screen text activation or deactivation, the corresponding features (e.g., indicated by the embeddings) in another video title are likely to cause a user to activate or deactivate on-screen text presentation accordingly.

Figure 4:
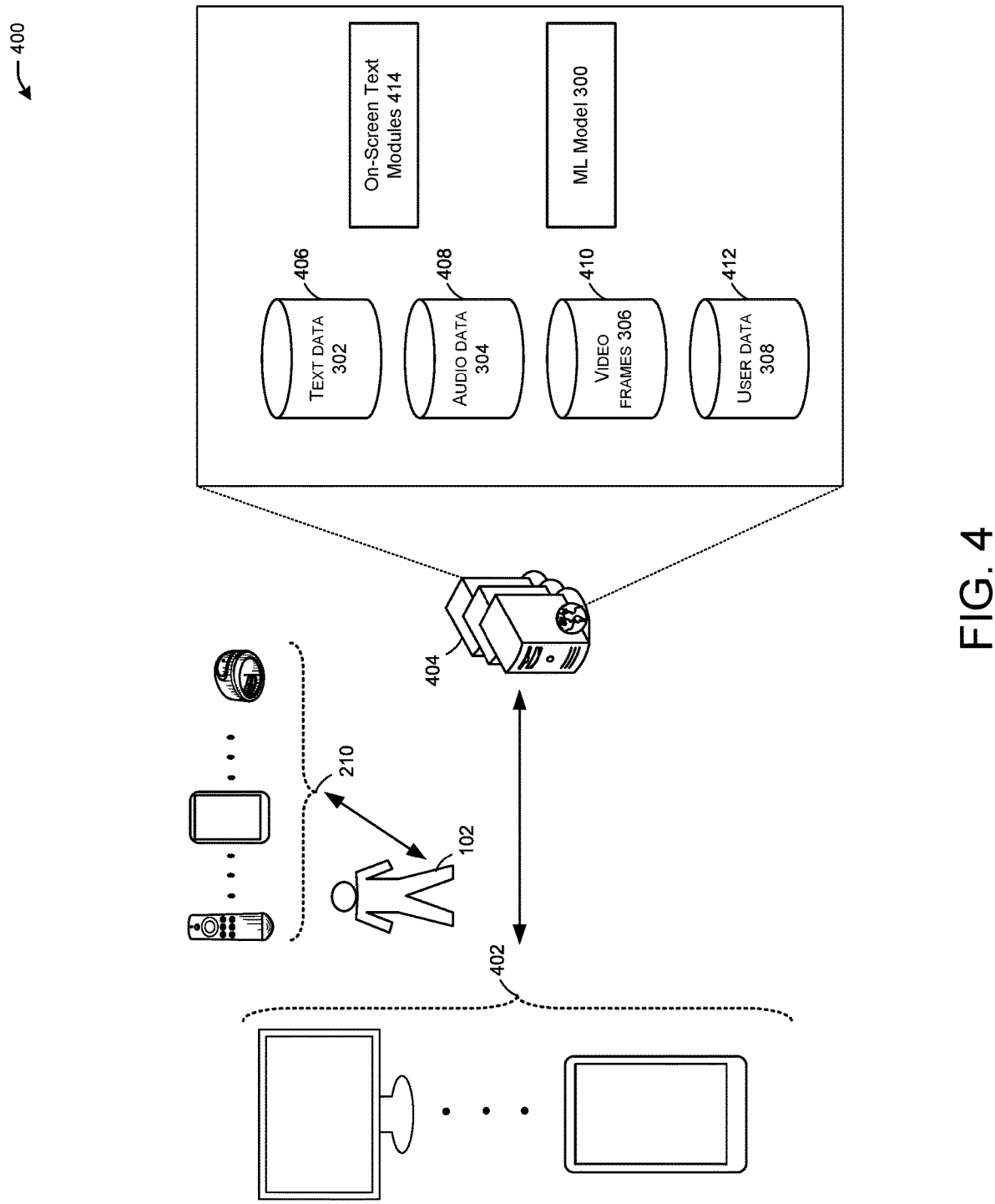
FIG. 4 illustrates example system for subtitle activation and deactivation, in accordance with one or more example embodiments of the present disclosure.

FIG. 4 illustrates example system 400 for subtitle activation and deactivation, in accordance with one or more example embodiments of the present disclosure.

Referring to FIG. 4, one or more devices 402 (e.g., including the device 106 of FIG. 1) may be used to present video content (e.g., the video content 104 of FIG. 1) to the user 102 of FIG. 1. The video content may be provided by a remote system 404 (e.g., a cloud-based system or other remote devices), which may include storage 406 for the text data 302 of FIG. 3, storage 408 for the audio data 304, storage 410 for the video frames 306, and storage 412 for the user data 308. The remote system 404 may generate and provide a bitstream to the one or more devices 402 for presentation by the one or more devices 402. For example, the bitstream may include streaming video content (e.g., a video title) and indications of when subtitles or other on-screen text is to be presented during presentation of a video title. The remote system 404 may include on-screen text modules 414 used to generate the indications of whether and when to activate and deactivate the subtitles and other on-screen text. The remote system 404 may include the ML model 300 of FIG. 3 for analyzing the embeddings of the text data 302, the audio data 304, the video frames 306, and the user data 308 to generate the on-screen text decisions 350 of FIG. 3 to be indicated in the bitstream. The user 102 may activate or deactivate subtitles, and/or may enable or disable automatic subtitle activation, using the devices 210 as described above.

In one or more embodiments, the one or more devices 402 and/or the devices 210 may detect ambient noise (e.g., environmental noise rather than the volume of the video). The devices 210 may provide an indication of the noise level to the one or more devices 402. The one or more devices 402 may compare the ambient noise level to a noise level threshold, and when the ambient noise exceeds the threshold, the one or more devices 402 may activate subtitles even when the user and/or the ML model 300 has deactivated the subtitles. Similarly, the one or more devices 402 may activate subtitles when the volume level of the audio used by the one or more devices 402 is lower than a volume threshold. When such an override occurs, the one or more devices 402 may provide an indication of the override to the remote system 404 to update the ML model 300.

In one or more embodiments, the one or more devices 402 may send user data for a user of a video application to the remote system 404 to identify the user and the user's preferences and current settings (e.g., preferred language, current volume levels, etc.). This information may be separate from the audio data 304 for the machine learning analysis. For example, the user preferences may be included in the user data 308.

In one or more embodiments, the user 102 may select how sensitive the ML-based response should be, similar to a difficulty level. For example, subtitles may be activated to help the user 102 only for very confident predictions. Such selections may be used (e.g., as thresholds) to classify and predict the need for subtitles.

FIG. 5 illustrates an example enabling and disabling process 500 for automatic subtitle activation and deactivation, in accordance with one or more example embodiments of the present disclosure.

Referring to FIG. 5, the enabling and disabling process 500 for automatic subtitle activation and deactivation allows the user 102 to set a setting that enables the automatic presentation of subtitles and/or other on-screen text based on the on-screen text decisions 350 of FIG. 3. The user 102 may use the devices 210 and/or voice commands to enable, via a settings indicator 502, the automatic on-screen text prediction and generation (e.g., facilitated by the machine learning model 300 of FIG. 3). The settings indicator 502 may be available in a menu outside of the presentation of the video content 104 of FIG. 1 so that the presentation of the video content 104 is not disrupted to enable the automatic subtitle activation and deactivation. Alternatively or in addition, the settings indicator 502 may be available during the presentation of the video content 104 so that the user 102 may enable and disable the automatic subtitle presentation at any time. For example, the user 102 may become tired of having to manually activate and deactivate subtitles, or may not be able to operate one of the devices 210 to manually activate and deactivate the subtitles. The user 102 may disable the automatic subtitles when the user 102 no longer wishes to see subtitles, or when the user 102 finds that the subtitles are not presented when the user 102 would prefer them to be presented. In this manner, the user's experience may be enhanced by the options to enable and disable the automatic subtitles.

Figure 6:
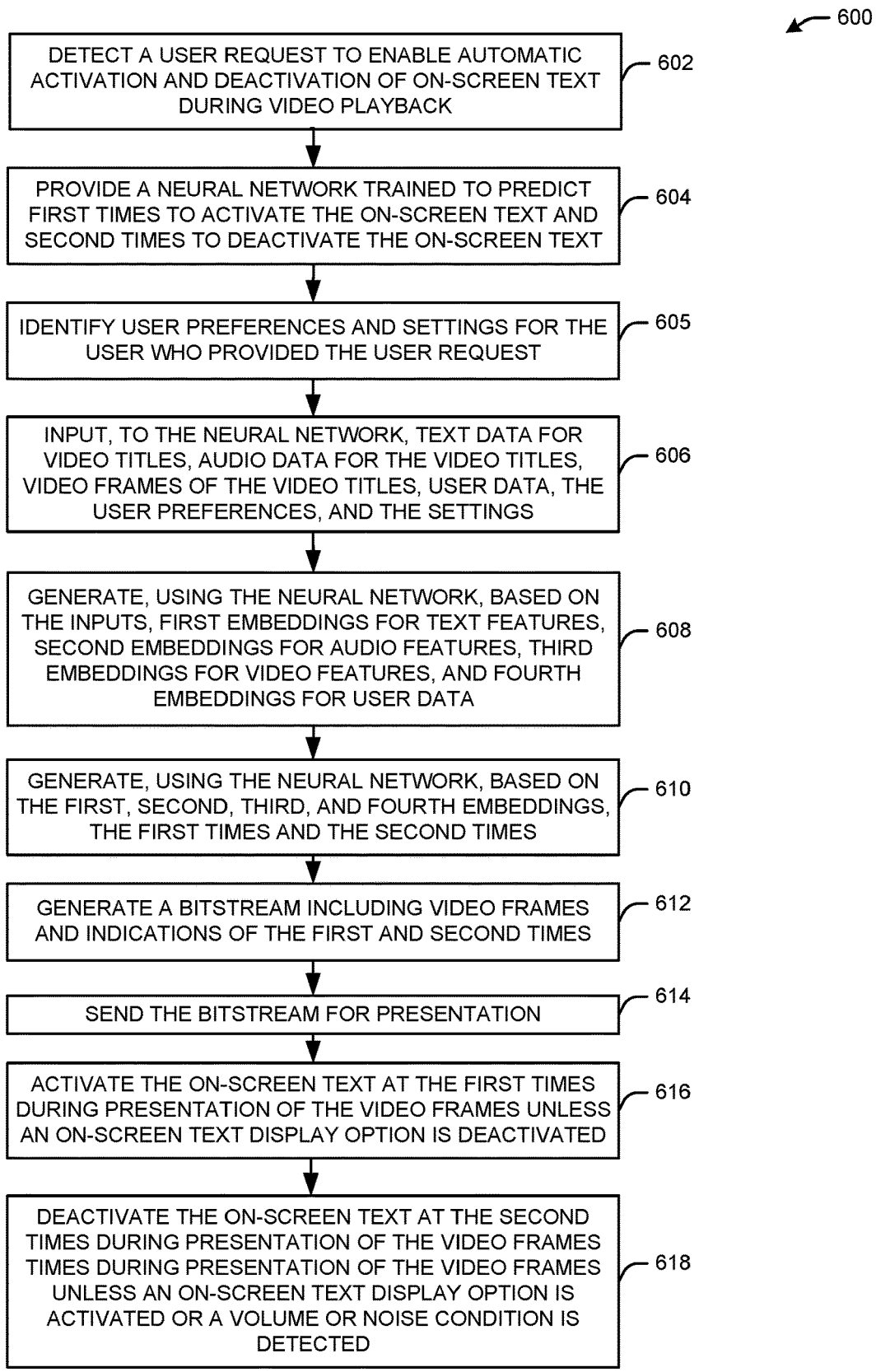
FIG. 6 illustrates a flow diagram for a process for subtitle activation and deactivation, in accordance with one or more example embodiments of the present disclosure.

FIG. 6 illustrates a flow diagram for a process 600 for subtitle activation and deactivation, in accordance with one or more example embodiments of the present disclosure.

At block 602, a system (e.g., including the device 106 of FIG. 1, the devices 210 of FIG. 2A, and/or the remote system 404 of FIG. 4) may detect a user request to enable automatic activation and deactivation of on-screen text (e.g., including subtitles) during video playback (e.g., during playback of a video title). The selection may be made by a user via voice command and/or input by a device (e.g., as shown in FIG. 5).

At block 604, the system may provide a neural network (e.g., the machine learning model 300 of FIG. 3) trained to predict first times when the on-screen text is to be presented and second times when the on-screen text is not to be presented. The times may be predicted based on when the current user and/or other users have activated or deactivated the on-screen text for the video title being presented or based on features of the video title being presented in comparison to features of other video titles watched by the user and/or other users.

At block 605, the system may identify user preferences (e.g., preferred language, subtitle activation preferences, what video content the user is watching, etc.) and settings (e.g., current volume settings compared to the user's usual volume settings) for the user who made the user request (e.g., the user to whom video is to be presented). For example, the one or more devices 410 of FIG. 4 may provide the user preferences and settings to the system for analysis.

At block 606, the system may input, to the neural network, text data for the video titles (e.g., the text data 302 of FIG. 3), audio data for the video titles (e.g., the audio data 304 of FIG. 3), video frames for the video titles (e.g., the video frames 306 of FIG. 3), user data for users of an application that may be used to present the video frames and the on-screen text (e.g., the user data 308 of FIG. 3), the user preferences, and the settings. The text data, audio data, video frames, and user data as inputs may be encoded by respective encoders (e.g., as shown in FIG. 3).

At block 608, the system may generate, using the neural network, first embeddings indicative of text features of the text data, second embeddings indicative of audio features of the audio data, third embeddings indicative of video features of the video frames, and fourth embeddings indicative of user features of the user data.

At block 610, the system may generate, using the neural network, based on the embeddings, the first and second times (e.g., the on-screen text decisions 350 of FIG. 3). For example, the convolutional layers 330 may determine when users have activated or deactivated subtitles during presentation of a particular video title. When the user 102 of FIG. 1 watches the video content 104, and the machine learning model 300 has identified when the user 102 or when other users have activated or deactivated subtitles or other on-screen text during the corresponding video title, the on-screen text decision 350 may indicate when the device 106 should activate and deactivate the presentation of subtitles or other on-screen text. When the user 102 is watching a video title that has not yet been analyzed for when users have activated and deactivated subtitles or other on-screen text during presentation of that video title, the machine learning model may use the embeddings from other video titles to predict when the user 102 would activate or deactivate the subtitles or other on-screen text. When the text, audio, and/or video have similar features to when subtitles or other on-screen text have been activated or deactivated during presentation of other video titles, the on-screen text decisions 350 may be based on the similar features. For example, when text and/or audio use a certain language, have a certain amount of words to display during a certain time period or during video frames with certain types or amounts of content represented during subtitle or other on-screen text activation or deactivation, the corresponding features (e.g., indicated by the embeddings) in another video title are likely to cause a user to activate or deactivate on-screen text presentation accordingly.

At block 612, a device of the system may generate a bitstream with the video frames of a video title to stream. The bitstream may include (e.g., in the syntax) indications of the first and second times for the video title whose frames are in the bitstream so that the device presenting the video frames may activate and deactivate the on-screen text accordingly. At block 614, the device may send the bitstream to another device of the system.

At block 616, the device that receives the bitstream may present the video frames and may activate the on-screen text at the first times during playback of the video frames. At block 618, the device that receives the bitstream may deactivate the on-screen text at the second times during playback of the video frames. The machine learning determination of the times when the on-screen text is to be activated or deactivated may be overridden by on-screen display activation/deactivation selected by the user, and/or by noise/volume conditions detected (e.g., whether the audio volume is lower than a threshold justifying activation of on-screen text, whether ambient noise level is higher than a threshold justifying activation of on-screen text). When an override of the machine learning on-screen text activation/deactivation occurs, the device that receives the bitstream may send an indication of the override and reason for it, and the system may update the machine learning model (e.g., to consider when the first and second times should be based on the volume settings and/or ambient noise data).

The descriptions herein are not meant to be limiting.

Figure 7:
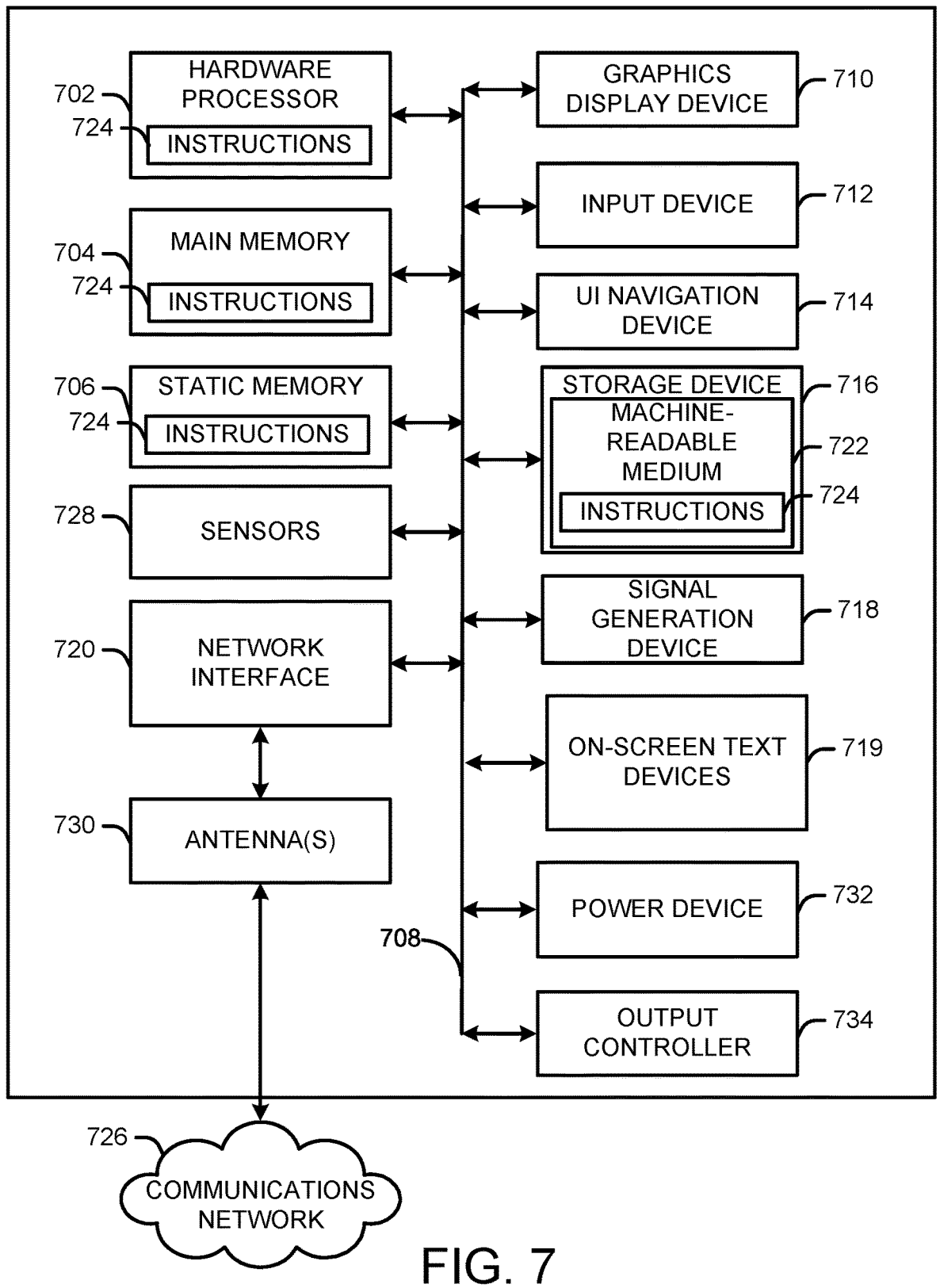
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., the device 106 of FIG. 1, the devices 210 of FIG. 2A, the devices 402 of FIG. 4, the remote system 404 of FIG. 4) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a tensor processing unit (TPU), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718, one or more on-screen text devices 719 (e.g., capable of performing steps according to FIGS. 1-6), a network interface device/transceiver 720 coupled to antenna(s) 730, and one or more sensors 728, such as a microphone. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for presenting on-screen text during video playback, the method comprising:
    detecting, by at least one processor of a first device, a user request to automatically determine when to activate and deactivate presentation of on-screen text during playback of a video using a streaming video application, the on-screen text comprising subtitles;
    providing, by at least one processor of a second device, a neural network trained to predict first times when the user is likely to activate the on-screen text and second times when the user is likely to deactivate the on-screen text based on identifying text features, audio features, video frame features, and user features at times when users have activated and deactivated subtitles;
    identifying, by the at least one processor of the second device, on-screen text preferences of the user;
    inputting, by the at least one processor of the second device, to the neural network, text data of video titles, audio data of the video titles, video frames of the video titles, and user data associated with users of the streaming video application, the user data comprising the on-screen text preferences;
    generating, by the at least one processor of the second device, using the neural network, first vector embeddings comprising first values indicative of first text features of the text data, second vector embeddings comprising second values indicative of first audio features of the audio data, third vector embeddings comprising third values indicative of first video features of the video frames, and fourth vector embeddings comprising fourth values indicative of first user features of the user data;

generating, by the at least one processor of the second device, using the neural network, based on comparisons of the first vector embeddings, the second vector embeddings, the third vector embeddings, and the fourth vector embeddings to the text features, the audio features, the video frame features, and the user features, predictions for the first times and the second times;

sending, by the at least one processor of the second device, to the first device, a bitstream comprising streaming video and indications of the first times and the second times;

activating, by the at least one processor of the first device, based on the first times, presentation of the on-screen text during presentation of the streaming video; and deactivating, by the at least one processor of the first device, based on the second times, presentation of the on-screen text during presentation of the streaming video.

2. The method of claim 1, wherein the neural network comprises a text encoder associated with generating the first vector embeddings, an audio encoder associated with generating the second vector embeddings, a video encoder associated with generating the third vector embeddings, and a user encoder associated with generating the fourth vector embeddings.

3. The method of claim 1, further comprising:
identifying the first times based on when users have activated the on-screen text during presentation of the streaming video; and
identifying the second times based on when the users have deactivated the on-screen text during presentation of the streaming video.

4. The method of claim 1, further comprising:
identifying the first times based on when users have activated the on-screen text during presentation of the video titles; and
identifying the second times based on when the users have deactivated the on-screen text during presentation of the video titles, wherein the streaming video is absent from the video titles.

5. A method for presenting on-screen text during video playback, the method comprising:
detecting, by at least one processor of a first device, a user request to automatically determine when to activate and deactivate presentation of on-screen text during playback of a video using a streaming video application;
providing, by at least one processor of a second device, a machine learning model trained to predict first times when the user is likely to activate the on-screen text and second times when the user is likely to deactivate the on-screen text based on identifying text features, audio features, video frame features, and user features at times when users have activated and deactivated subtitles;
inputting, by the at least one processor of the second device, to the machine learning model, text data of video titles, audio data of the video titles, video frames of the video titles, and user data associated with users of the streaming video application, the user data comprising on-screen text preferences of the user;
generating, by the at least one processor of the second device, using the machine learning model, based on comparisons of the text data, the audio data, the video frames, and the user data to the text features, the audio features, the video frame features, and the user features, predictions for the first times and the second times;

sending, by the at least one processor of the second device, to the first device, a bitstream comprising streaming video and indications of the first times and the second times;

activating, by the at least one processor of the first device, based on the first times, presentation of the on-screen text during presentation of the streaming video; and deactivating, by the at least one processor of the first device, based on the second times, presentation of the on-screen text during presentation of the streaming video.

6. The method of claim 5, wherein the machine learning model comprises a text encoder associated with generating first embeddings based on the text data, an audio encoder associated with generating second embeddings based on the audio data, a video encoder associated with generating third embeddings based on the video frames, and a user encoder associated with generating fourth embeddings based on the user data.

7. The method of claim 6, wherein the first embeddings comprise a vector of first values indicative of text features of subtitles, wherein the second embeddings comprise a vector of second values indicative of audio features of spoken audio and background noise, and wherein the third embeddings comprise a vector of third values indicative of a number of video frames during which the on-screen text is to be presented, and wherein the comparisons comprise comparing the text features, the audio features, and the video frame features to the vector of first values, the vector of second values, and the vector of third values.

8. The method of claim 7, wherein the fourth embeddings comprise a vector of fourth features indicative of when a user from which the user request was received has activated the on-screen text and of when the user has deactivated the on-screen text, and wherein the comparisons further comprise comparing the user features to the vector of fourth values.

9. The method of claim 7, wherein the fourth embeddings comprise a vector of fourth features indicative of when users of the streaming video application have activated the on-screen text and of when the users have deactivated the on-screen text, and wherein the comparisons further comprise comparing the user features to the vector of fourth values.

10. The method of claim 5, further comprising:
identifying the first times based on when users have activated the on-screen text during presentation of the streaming video; and
identifying the second times based on when the users have deactivated the on-screen text during presentation of the streaming video.

11. The method of claim 5, further comprising:
identifying the first times based on when users have activated the on-screen text during presentation of the video titles; and
identifying the second times based on when the users have deactivated the on-screen text during presentation of the video titles, wherein the streaming video is absent from the video titles.

12. The method of claim 5, further comprising:
detecting, during presentation of the streaming video during one of the second times, a second user selection to activate the on-screen text, that a volume of the first device is below a volume threshold, or that an ambient noise level exceeds an ambient noise threshold;

sending, to the second device, an indication that presentation of the on-screen text was activated during the one of the second times based on the second user selection, the volume being below the volume threshold, or the ambient noise level exceeding the ambient noise threshold; and updating the machine learning model based on the indication, wherein activating the presentation of the on-screen text during presentation of the streaming video is further based on the second user selection, the volume being below the volume threshold, or the ambient noise level exceeding the ambient noise threshold.

13. The method of claim 12, wherein the second user selection is based on a first user push of a button unassociated with an on-screen selection, and wherein the presentation of the on-screen text is deactivated based on a second user push of the button or by depressing the button.

14. The method of claim 12, wherein the second user selection is based on a user hovering a selector over a portion of a display of the first device to activate the presentation of the on-screen text, and wherein the presentation of the on-screen text is deactivated based on the user moving the selector off of the portion of the display.

15. The method of claim 14, wherein the second user selection is based on the user selecting an on-screen text option while hovering the selector over the portion of the display.

16. The method of claim 14, wherein the hovering is unassociated with a subsequent user input to activate the presentation of the on-screen text.

17. A system for presenting on-screen text during video playback, the system comprising:
a first device comprising first memory coupled to at least one processor; and
a second device, wherein the at least one processor is configured to:
detect a user request to automatically determine when to activate and deactivate presentation of on-screen text during playback of a video using a streaming video application;
receive a bitstream from the second device, the bitstream comprising streaming video and indications of first times when the user is likely to activate the on-screen text and second times when the user is likely to deactivate the on-screen text
activate, based on the first times, presentation of the on-screen text during presentation of the streaming video; and
deactivate, based on the second times, presentation of the on-screen text during presentation of the streaming video, wherein the second device is configured to:
provide a machine learning model trained to predict the first times and the second times based on identifying text features, audio features, video frame features, and user features at times when users have activated and deactivated subtitles;
input, to the machine learning model, text data of video titles, audio data of the video titles, video frames of the video titles, and user data associated with users of the streaming video application, the user data comprising on-screen text preferences of the user;
generate, using the machine learning model, based on comparisons of the text data, the audio data, the video frames, and the user data to the text features, the audio features, the video frame features, and the user features, predictions for the first times and the second times; and
send, to the first device, the bitstream.

18. The system of claim 17, wherein the machine learning model comprises a text encoder associated with generating first embeddings based on the text data, an audio encoder associated with generating second embeddings based on the audio data, a video encoder associated with generating third embeddings based on the video frames, and a user encoder associated with generating fourth embeddings based on the user data.

19. The system of claim 18, wherein the first embeddings comprise a vector of first features indicative of text features of subtitles, wherein the second embeddings comprise a vector of second features indicative of audio features of spoken audio and background noise, and wherein the third embeddings comprise a vector of third features indicative of a number of video frames during which the on-screen text is to be presented, and wherein the comparisons comprise comparing the text features, the audio features, and the video frame features to the vector of first values, the vector of second values, and the vector of third values.

20. The system of claim 19, wherein the fourth embeddings comprise a vector of fourth features indicative of when a user from which the user request was received has activated the on-screen text and of when the user has deactivated the on-screen text, and wherein the comparisons further comprise comparing the user features to the vector of fourth values.

* * * * *